United States Patent
LeCrone et al.

(10) Patent No.: US 11,163,644 B2
(45) Date of Patent: Nov. 2, 2021

(54) STORAGE BOOST

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 212 days.

(21) Appl. No.: 16/558,562

(22) Filed: Sep. 3, 2019

(65) Prior Publication Data

US 2021/0064470 A1 Mar. 4, 2021

(51) Int. Cl.
*G06F 11/14* (2006.01)
*G06F 3/06* (2006.01)
*G06F 9/4401* (2018.01)
*G06F 9/44* (2018.01)

(52) U.S. Cl.
CPC ........ *G06F 11/1417* (2013.01); *G06F 3/0604* (2013.01); *G06F 3/0653* (2013.01); *G06F 3/0673* (2013.01); *G06F 9/4401* (2013.01); *G06F 11/1451* (2013.01); *G06F 11/1469* (2013.01)

(58) Field of Classification Search
CPC .. G06F 11/1417; G06F 3/0604; G06F 3/0653; G06F 9/4401; G06F 11/1451; G06F 11/1469; G06F 3/0673; G06F 3/061; G06F 3/0689; G06F 3/067; G06F 3/0629
USPC .................................................. 713/1, 2, 100
See application file for complete search history.

(56) References Cited

U.S. PATENT DOCUMENTS

2013/0332771 A1* 12/2013 Salapura ............. G06F 11/1415
 714/15
2016/0283338 A1* 9/2016 Ramalingam ......... G06F 9/4411

* cited by examiner

*Primary Examiner* — Michael J Brown
(74) *Attorney, Agent, or Firm* — Muirhead and Saturnelli, LLC

(57) ABSTRACT

Adapting a storage system in response to operation of a corresponding host includes determining whether the host is performing a boot up operation, determining whether the host is performing a shutdown operation, and adapting operation of the storage system in response to the host performing one of: a boot up operation or a shutdown operation. Adapting operation of the storage system may include suspending low-priority housekeeping tasks, decreasing work queue scan times to be more responsive to incoming work, moving cores from other emulations, increasing thread counts, and/or preloading specified files into cache memory of the storage system. Determining whether the host is performing a boot up operation may include making a call from the storage system to the host that causes the host to return an indication thereof. Operations that are characteristic of booting up may be determined by machine learning.

20 Claims, 4 Drawing Sheets

STORAGE BOOST

TECHNICAL FIELD

This application relates to the field of computer systems and storage systems therefor and, more particularly, to the field of detecting a state of a host computer system and adapting operation of a corresponding storage system according to a detected state.

BACKGROUND OF THE INVENTION

Host processor systems (hosts) may store and retrieve data using a storage system containing a plurality of host interface units (I/O modules), physical storage units (e.g., disk drives, solid state drives), and disk interface units (disk adapters). The host systems access the storage system through a plurality of channels provided therewith. Host systems provide data and access control information through the channels to the storage system and the storage system provides data to the host systems also through the channels. The host systems do not address the physical storage units of the storage system directly, but rather, access what appears to the host systems as a plurality of logical volumes. The logical volumes may or may not correspond to the physical storage units. Allowing multiple host systems to access the single storage system allows the host systems to share data stored therein.

Some host systems are capable of providing additional processing resources and/or speed in connection with starting up or shutting down. For example, IBM provides a feature called System Recover Boost that improves IPL (system booting) and system shutdown performance during a planned or unplanned outage. System Recovery Boost temporarily provides a boost in CPU capacity for a relatively short period of time (e.g., thirty minutes) by allowing full CPU speed on sub-capacity CPUs in addition to allowing otherwise specialized processors (e.g., zIIPs, which are usually reserved for specialty processing like Java and XML) to be used as general CPUs.

Note that some of the processes associated with starting up or shutting down a host system will access data storage in connection therewith. However, the efficiency/performance/throughput associated with accessing data on a storage system is not necessarily improved by improving processor performance/speed on the host system. This is because data access times are largely governed by processing speeds and similar constraints of the storage system that are independent of the host. Thus, despite providing more CPU resources in connection with System Recovery Boost (or similar on other host systems), data access throughput for storage systems is not appreciably improved. Note also that, even if a host does not have System Recovery Boost (or similar), it could still be advantageous for a storage system to make data access more efficient and improve throughput in connection with a corresponding host either booting up or shutting down.

Accordingly, it is desirable to provide a mechanism to improve storage system data access efficiency and throughput whenever a host is booting up or shutting down.

SUMMARY OF THE INVENTION

According to the system described herein, adapting a storage system in response to operation of a corresponding host includes determining whether the host is performing a boot up operation, determining whether the host is performing a shutdown operation, and adapting operation of the storage system in response to the host performing one of: a boot up operation or a shutdown operation. Adapting operation of the storage system may include suspending low-priority housekeeping tasks, decreasing work queue scan times to be more responsive to incoming work, moving cores from other emulations, increasing thread counts, and/or preloading specified files into cache memory of the storage system. Determining whether the host is performing a boot up operation may include making a call from the storage system to the host that causes the host to return an indication thereof. Determining whether the host is performing a boot up operation may include the storage system detecting operations by the host that are characteristic of booting up. Operations that are characteristic of booting up may be determined by machine learning. Determining whether the host is performing a shutdown operation may include making a call from the storage system to the host that causes the host to return an indication thereof. Determining whether the host is performing a shutdown operation may include the storage system detecting operations by the host that are characteristic of shutting down. Operations that are characteristic of shutting down may be determined by machine learning. The host may provide a direct indication to the storage device to indicate that the host is booting up or shutting down. The host may perform accelerated processing in connection with booting up or shutting down.

According further to the system described herein, a non-transitory computer readable medium contains software that adapts a storage system in response to operation of a corresponding host. The software includes executable code that determines whether the host is performing a boot up operation, executable code that determines whether the host is performing a shutdown operation, and executable code that adapts operation of the storage system in response to the host performing one of: a boot up operation or a shutdown operation. Adapting operation of the storage system may include suspending low-priority housekeeping tasks, decreasing work queue scan times to be more responsive to incoming work, moving cores from other emulations, increasing thread counts, and/or preloading specified files into cache memory of the storage system. Determining whether the host is performing a boot up operation may include making a call from the storage system to the host that causes the host to return an indication thereof. Determining whether the host is performing a boot up operation may include the storage system detecting operations by the host that are characteristic of booting up. Operations that are characteristic of booting up may be determined by machine learning. Determining whether the host is performing a shutdown operation may include making a call from the storage system to the host that causes the host to return an indication thereof. Determining whether the host is performing a shutdown operation may include the storage system detecting operations by the host that are characteristic of shutting down. Operations that are characteristic of shutting down may be determined by machine learning. The host may provide a direct indication to the storage device to indicate that the host is booting up or shutting down. The host may perform accelerated processing in connection with booting up or shutting down.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein detects when a host is booting up or shutting down and provides special (accelerated) processing for a corresponding storage system to improve throughput and efficiency of the storage system by loading specific files/data and/or performing special processing. The storage system may detect/infer the state of the host or may receive state information directly, either through a call by the host to the storage system or in response to a query by the storage system to the host. In instances where accelerated processing is used by the host to facilitate booting up and shutdown (e.g., System Recovery Boost used by IBM), the system described herein provides synergy with the host operations that allows the storage system to provide additional performance during booting up and shutdown to expedite disaster recovery. Note, however, that the system described herein may adjust operation of the storage system even in cases where there is no accelerated processing (i.e., no System Recovery Boost feature or similar) provided by the host in connection with booting up or shutting down.

Figure 1:
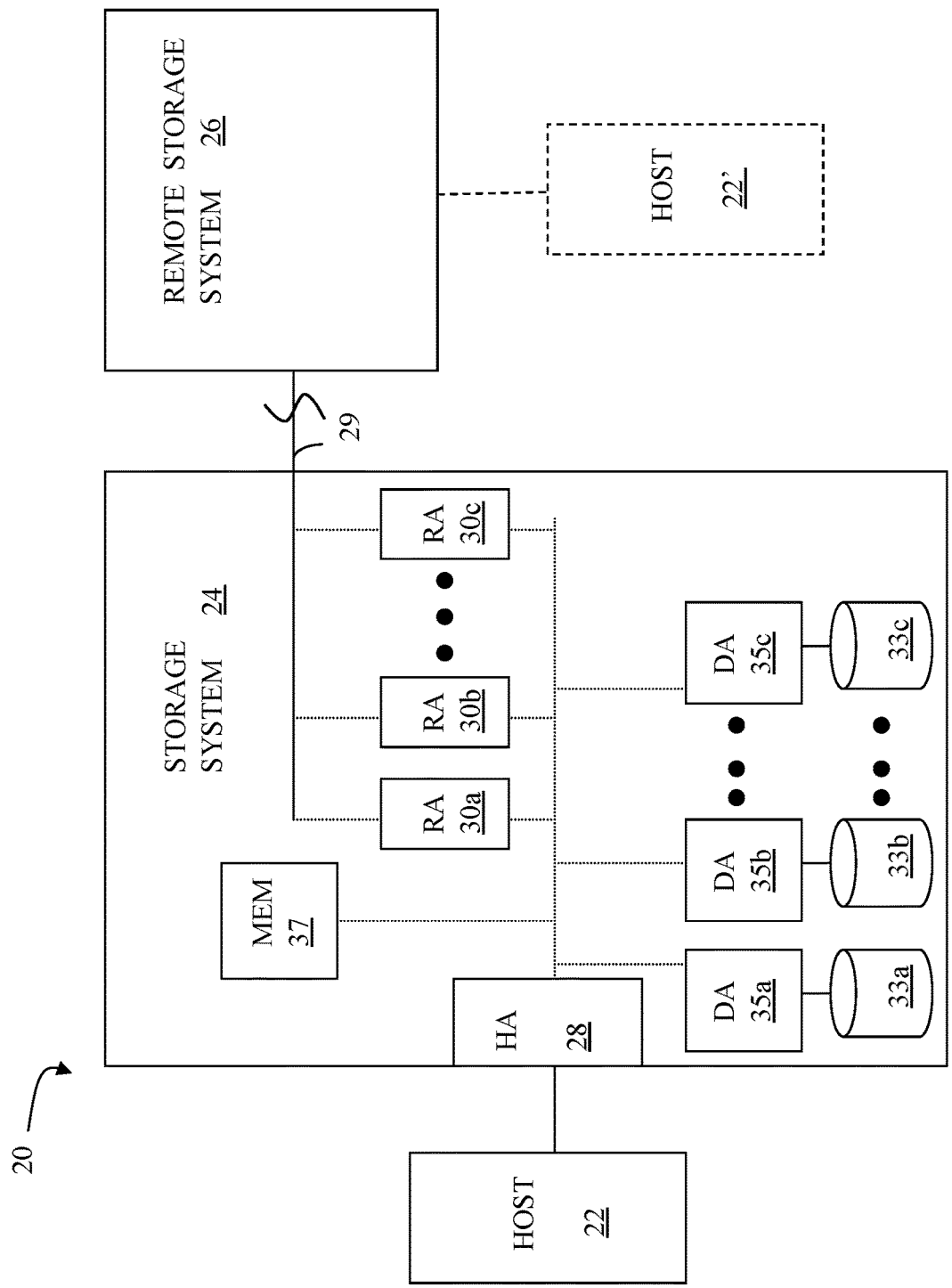
FIG. 1 is a schematic illustration of a storage system showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a Symmetrix or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
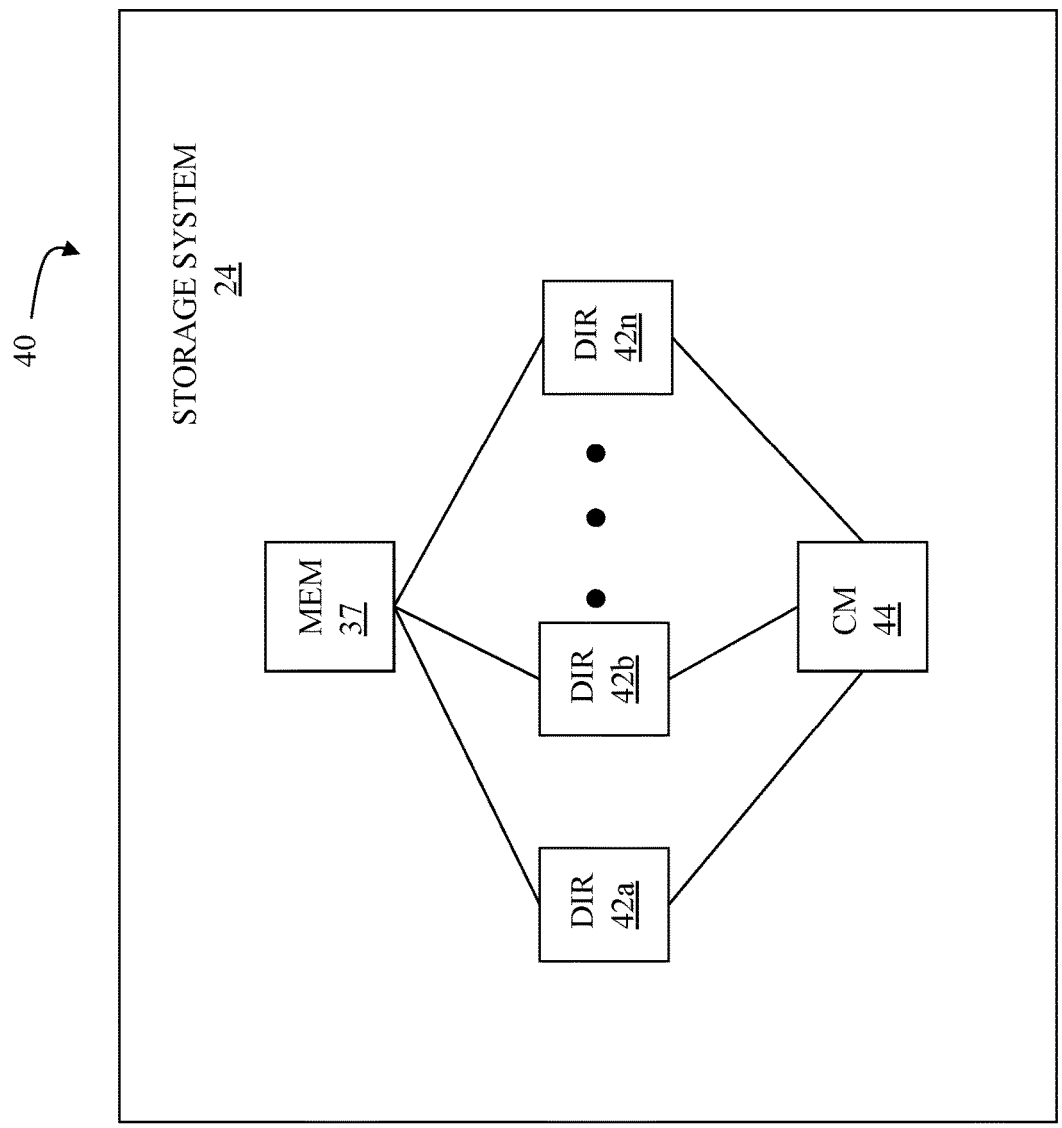
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
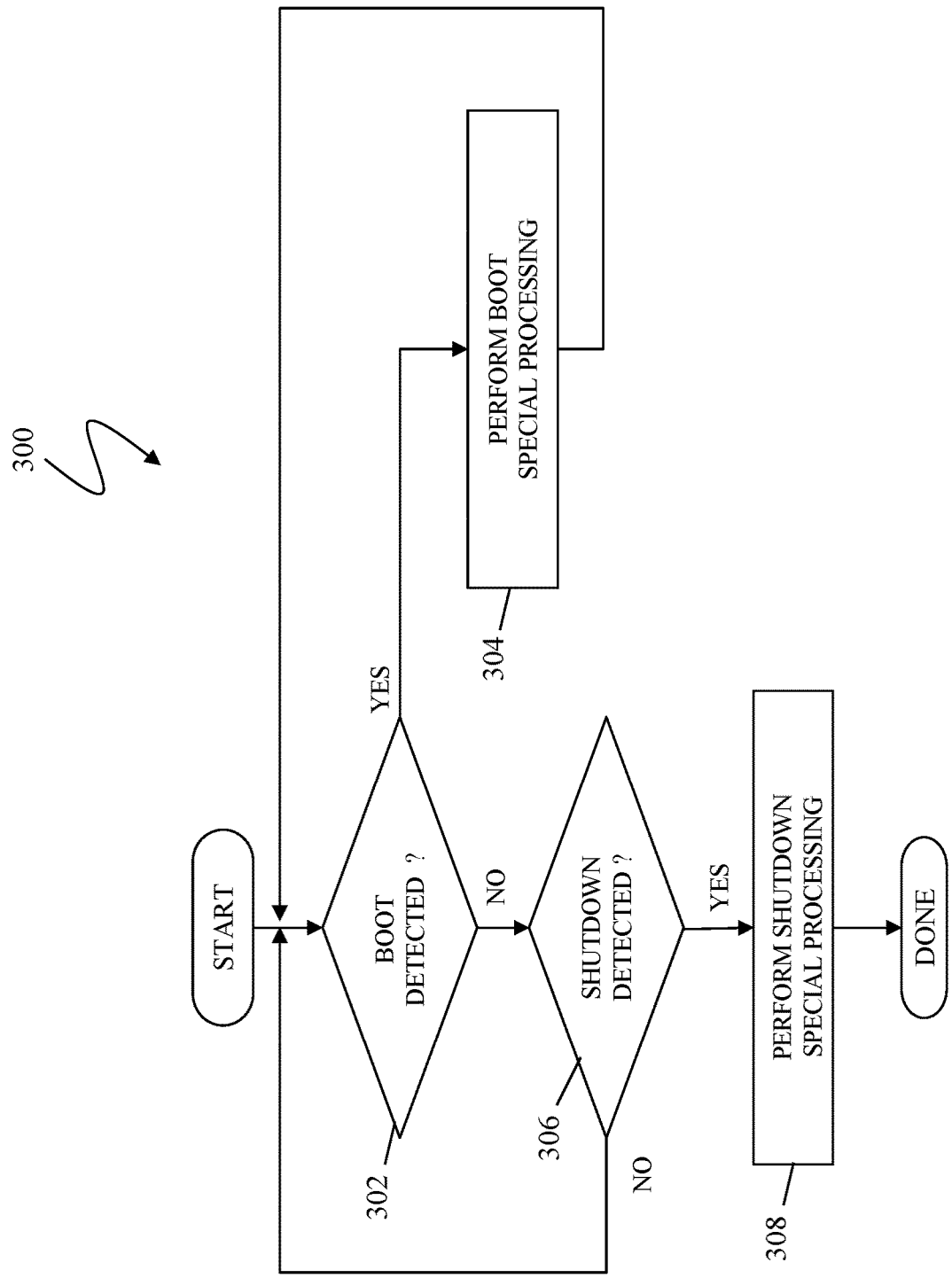
FIG. 3 is a flow diagram showing processing by a storage system in connection with handling booting or a shutdown of a host according to embodiments of the system described herein.

Referring to FIG. 3, a flow diagram 300 illustrates processing performed at a storage system in connection with initiating a special mode thereon in response to a host either booting up (e.g., performing an IPL) or shutting down. A storage system, such as the storage system 24 discussed above in connection with FIG. 1, may detect whether a connected host is booting up or shutting down using a variety of different mechanisms. In the case of an IBM host using the System Recovery Boost capability, the storage system may make a call to the IBM host using a GETIBOOST command and the host may respond to the GETIBOOST command by returning either: 1) an indication that the host does not have the System Recovery Boost capability; 2) an indication that the host does have the System Recovery Boost capability and the host is currently performing a System Recovery Boost; or 3) an indication that the host does have the System Recovery Boost capability and the host is not currently performing a System Recovery Boost (i.e., is in normal operation mode). Of course, there are other possible mechanisms for determining if the host is currently booting up or shutting down, including detecting data/file access patterns characteristic of either booting up or a planned shutdown based on past access patterns for previous startup and planned shutdown operations. There also may be specific commands/operations (e.g., read IPL, establish/disband group path, etc.) that the host provides to the storage system in connection with either booting up or shutting down. It may also be possible to add a host API command for the specific purpose of providing a startup or a shutdown indication directly to the storage system; the host directly calls and provides a direct indication to the storage system using the API command.

Processing for the flow diagram 300 begins at a test step 302 where it is determined if the host is booting up. The test at the step 302 may use any appropriate mechanism, including mechanisms discussed elsewhere herein. If it is determined at the test step 302 that the host is booting up, then control transfers from the test step 302 to a step 304 where the storage system performs whatever operations that can assist in the booting up process. In an embodiment herein, the specific processing performed at the step 304 may be configurable using, for example, a batch file or a special application prepared by a user for the purpose of loading specific files and performing specific operations in connection with booting up. In other embodiments, the system may anticipate what is needed using, for example, machine learning following a number of prior boot up operations either in the field, in a lab/factory setting, or both. The machine learning may be used to generate training data as described in more detail elsewhere herein and, in some cases, may be used for run time detection of booting up characteristics by the host. The storage system may provide short-term performance improvements by, for example, suspending low-priority housekeeping tasks, decreasing work queue scan times to be more responsive to incoming work, moving cores from other emulations, increasing thread counts, and preloading specified files into cache memory of the storage system. Following the step 304, control transfers back to the test step 302 to continue polling.

If it is determined at the test step 302 that the host is not booting up, then control transfers from the step 302 to a step 306 where it is determined if the host is performing a planned shutdown. Note that unplanned shutdowns usually occur without any warning or preparation of often an unplanned shutdown causes operation of a device to suddenly cease. A planned shutdown by the host may be detected at the step 306 using mechanisms similar to mechanisms used to detect a boot operation by the host, including, for example, detecting data/file access patterns consistent with a planned shutdown based on past access patterns for previous planned shutdown operations, specific commands/operations that the host provides to the storage system in connection with shutting down, etc. As with booting up, machine learning may be used to generate training data as described in more detail elsewhere herein and, in some cases, may be used for run time detection of shutting down characteristics by the host. It may also be possible to add a host API for the specific purpose of providing a shutdown indication directly from the host to the storage system.

If it is determined at the step 306 that the host is not shutting down, then control transfers back to the test step 302 to continue polling to detect the host both shutting down and booting up, as discussed elsewhere herein. Otherwise, if it is determined at the step 306 that the host is shutting down, then control transfers from the step 306 to a step 308 where the storage system performs whatever operations that can assist in shutting down. In an embodiment herein, the specific processing performed at the step 308 may be configurable using, for example, a batch file or a special application prepared by a user for the purpose of loading specific files and performing specific operations. In other embodiments, the system may anticipate what is needed using, for example, machine learning following a number of prior planned shutdown operations either in the field, in a lab/factory setting, or both. In some cases, the system may destage cache data in response to detecting a shutdown operation. Just as with booting up, the system may also provide short-term performance improvements by, for example, suspending low-priority housekeeping tasks, decreasing work queue scan times to be more responsive to incoming work, moving cores from other emulations, increasing thread counts, and preloading specified files into cache. Following the step 308, processing is complete.

Figure 4:
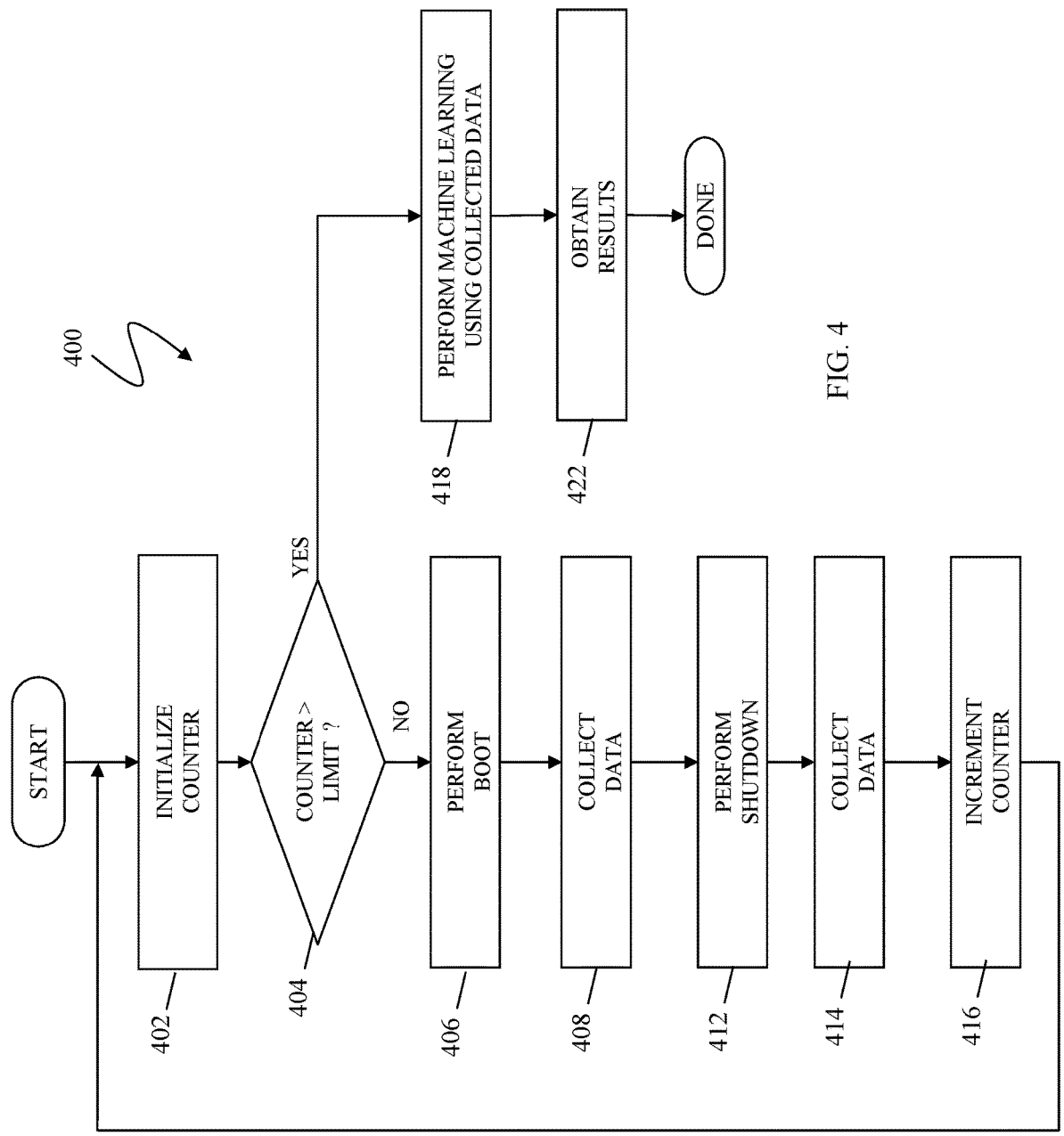
FIG. 4 is a flow diagram showing processing performed in connection with obtaining training data used by a machine learning system according to embodiments of the system described herein.

Referring to FIG. 4, a flow diagram 400 illustrates process performed in connection with generating data to train a machine learning engine to generate data used in connection with the system described herein. The generated data may include data used to detect when the host is booting up or shutting down (i.e., host operations that are characteristic of booting up or shutting down) and data indicating what files need to be loaded and/or other processes that need to be performed in connection with booting up or shutting down. Note that, in embodiments where a host provides to a corresponding storage system a direct indication of booting up or shutting down (e.g., using an API call or in response to a call to the host by the storage system), it may not be necessary to provide machine learning that detects booting up or shutting down. This is because a direct call is usually more reliable than indirectly detecting a particular state based on operation of a system. Note also that detecting files that need to be loaded or other processes to be performed assists in the processing provided at the steps 304, 308, discussed above.

Processing begins at a first step 402 where a counter, used to count a number of iterations for cycling the system, is initialized. Following the step 402 is a test step 404 where it is determined if the counter has exceeded a predetermined limit corresponding to a number of iterations that the system cycles to generate needed information. This limit may be empirically determined based on the number of cycles needed for the data and the results to converge. That is, if the results after, for example, ten cycles, are the same no matter how many more cycles are run (e.g., fifty cycles), then the limit may be set to ten. Note that, as discussed elsewhere herein, the processing illustrated by the flow diagram 400 may be performed at a customer site, in a lab/factory setting, or both.

If it is determined at the test step 404 that the counter does not exceed the limit, then control transfers from the test step 404 to a step 406 where the host is made to perform a boot operation (IPL). Following the step 406 is a step 408 where data corresponding to the boot operation is collected. Following the step 408 is a step 412 where the system is made to perform a shutdown operation. Following the step 412 is a step 414 where data corresponding to the shutdown operation is collected. Following the step 414 is a step 416 where the iteration counter is incremented. Following the step 416, control transfers back to the step 404, discussed above, where the iteration counter is compared to the limit, discussed above.

If it is determined at the test step 404 that the iteration counter exceeds the predetermined limit, then control transfers from the test step 404 to a step 418 where data collected at the steps 408, 414, described above, is provided to a machine learning system. The machine learning system may be a conventional neural network or other type of machine learning system that is capable of providing the functionality described herein. The machine learning system may be a commercially available machine learning system. Following the step 418 is a step 422 where the machine learning system determines data corresponding to booting up and shutting down, as described elsewhere herein. Note that the data generated by the machine learning system at the step 422 includes data that allows the storage system to detect the host booting up and shutting down (if not provided directly by the host, as described elsewhere herein) as well as data corresponding to files, etc. that are accessed/pre-loaded by the storage system when the host is booting up or shutting down as well as any additional processes that are performed. Following the step 422, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of adapting a storage system in response to operation of a corresponding host, comprising:
the storage system determining whether the host is performing a boot up operation by sending a query to the host that causes the host to return a response that is an indication of whether the host is performing a boot up operation;

the storage system determining whether the host is performing a shutdown operation by sending a query to the host that causes the host to return a response that is an indication of whether the host is performing a shutdown operation; and adapting operation of the storage system in response to the host performing one of: a boot up operation or a shutdown operation.

2. A method, according to claim 1, wherein adapting operation of the storage system includes at least one of: suspending low-priority housekeeping tasks, decreasing work queue scan times to be more responsive to incoming work, moving cores from other emulations, increasing thread counts, and preloading specified files into cache memory of the storage system.

3. A method, according to claim 1, wherein the host provides a direct indication to the storage system to indicate that the host is booting up or shutting down.

4. A method, according to claim 1, wherein the host performs accelerated processing in connection with booting up or shutting down.

5. A method, according to claim 1, wherein, in response to receiving the query, the host returns an indication that the host does not have a system recovery boost capability, an indication that the host does have system recovery boost capability and the host is currently performing a system recovery boost operation, or an indication that the host does have system recovery boost capability and the host is not currently performing a system recovery boost operation.

6. A method, according to claim 1, wherein the storage system is a stand-alone device coupled to the host.

7. A method, according to claim 6, wherein the storage system includes a plurality of directors that each have a plurality of processors.

8. A method, according to claim 7, wherein at least one of the directors provides communication between the host and the storage system.

9. A non-transitory computer readable medium containing software that adapts a storage system in response to operation of a corresponding host, the software comprising:

executable code at the storage system that determines whether the host is performing a boot up operation by sending a query to the host that causes the host to return a response that is an indication of whether the host is performing a boot up operation;

executable code at the storage system that determines whether the host is performing a shutdown operation by sending a query to the host that causes the host to return a response that is an indication of whether the host is performing a shutdown operation; and executable code that adapts operation of the storage system in response to the host performing one of: a boot up operation or a shutdown operation.

10. A non-transitory computer readable medium, according to claim 9, wherein adapting operation of the storage system includes at least one of: suspending low-priority housekeeping tasks, decreasing work queue scan times to be more responsive to incoming work, moving cores from other emulations, increasing thread counts, and preloading specified files into cache memory of the storage system.

11. A non-transitory computer readable medium, according to claim 9, wherein the host provides a direct indication to the storage system to indicate that the host is booting up or shutting down.

12. A non-transitory computer readable medium, according to claim 9, wherein the host performs accelerated processing in connection with booting up or shutting down.

13. A non-transitory computer readable medium, according to claim 9, wherein, in response to receiving the query, the host returns an indication that the host does not have a system recovery boost capability, an indication that the host does have system recovery boost capability and the host is currently performing a system recovery boost operation, or an indication that the host does have system recovery boost capability and the host is not currently performing a system recovery boost operation.

14. A non-transitory computer readable medium, according to claim 9, wherein the storage system is a stand-alone device coupled to the host.

15. A non-transitory computer readable medium, according to claim 14, wherein the storage system includes a plurality of directors that each have a plurality of processors.

16. A non-transitory computer readable medium, according to claim 15, wherein at least one of the directors provides communication between the host and the storage system.

17. A storage system, comprising:

a plurality of interconnected directors;

a plurality of non-volatile storage units, each of which is coupled to at least one of the directors; and a plurality of processors provided on each of the directors, wherein at least one of the processors accesses memory containing software that, when executed, determines whether the host is performing a boot up operation by sending a query to the host that causes the host to return a response that is an indication of whether the host is performing a boot up operation, determines whether the host is performing a shutdown operation by sending a query to the host that causes the host to return a response that is an indication of whether the host is performing a shutdown operation, and adapts operation of the storage system in response to the host performing one of: a boot up operation or a shutdown operation.

18. A storage system, according to claim 17, wherein adapting operation of the storage system includes at least one of: suspending low-priority housekeeping tasks, decreasing work queue scan times to be more responsive to incoming work, moving cores from other emulations, increasing thread counts, and preloading specified files into cache memory of the storage system.

19. A storage system, according to claim 17, wherein the host provides a direct indication to the storage system to indicate that the host is booting up or shutting down.

20. A storage system, according to claim 17, wherein the host performs accelerated processing in connection with booting up or shutting down.

* * * * *